(12) United States Patent  (10) Patent No.: US 7,688,282 B2
Motoe  (45) Date of Patent: Mar. 30, 2010

(54) INFORMATION PROCESSING APPARATUS

(75) Inventor: Hironori Motoe, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 883 days.

(21) Appl. No.: 11/455,160

(22) Filed: Jun. 15, 2006

(65) Prior Publication Data
US 2007/0024605 A1  Feb. 1, 2007

(30) Foreign Application Priority Data
Jul. 29, 2005  (JP) ............................. P2005-221056

(51) Int. Cl.
G09G 5/00 (2006.01)
G09G 3/00 (2006.01)
(52) U.S. Cl. .................. 345/32; 345/4; 345/5; 345/204
(58) Field of Classification Search ............... 345/5, 345/32, 204
See application file for complete search history.

(56) References Cited

U.S. PATENT DOCUMENTS 5,059,957 A * 10/1991 Todoriki et al. ............... 345/7
5,194,954 A    3/1993 Duffield
5,233,333 A *  8/1993 Borsuk ..................... 345/660
6,211,930 B1 * 4/2001 Sautter et al. ................ 349/66
6,765,550 B2 * 7/2004 Janick et al. .................. 345/87

FOREIGN PATENT DOCUMENTS

| JP | 2002247477 A | * | 8/2002 |
| JP | 2004-062094 |  | 2/2004 |
| JP | 2004-133334 |  | 4/2004 |
| JP | 2004-151329 |  | 5/2004 |
| JP | 2004-219677 |  | 8/2004 |
| JP | 2004-233527 |  | 8/2004 |
| JP | 2004-252811 |  | 9/2004 |
| JP | 2005-012297 |  | 1/2005 |
| JP | 2005012297 A | * | 1/2005 |
| JP | 2005-055611 |  | 3/2005 |
| WO | 2005019919 A1 |  | 3/2005 |
| WO | WO 2005019919 A1 | * | 3/2005 |

OTHER PUBLICATIONS

English translation of a First Office Action dated May 9, 2008 issued in a counterpart European application.
China patent application No. CN 1057747A—English counterpart submitted as U.S. Patent No. 5,194,954.
English Translation of Office Action for Japanese Patent Application No. 2005-221056 dated Oct. 14, 2008.
Japanese Patent Application N. 2005-221056 Notification of Reasons for Refusal mailed Feb. 24, 2009 (English Translation).

* cited by examiner

Primary Examiner—Bipin Shalwala
Assistant Examiner—Ilana Spar
(74) Attorney, Agent, or Firm—Blakely Sokoloff Taylor & Zafman, LLP

(57) ABSTRACT

According to one embodiment, an information processing apparatus that includes a display panel; a filter facing the display panel; and a drive section turns on the filter in response to driving start of the display panel.

13 Claims, 10 Drawing Sheets

SLANTING AT LEFT　　　FRONT　　　SLANTING AT RIGHT

US 7,688,282 B2

INFORMATION PROCESSING APPARATUS

CROSS-REFERENCE TO RELATED APPLICATIONS

This application is based upon and claims the benefit of priority from Japanese Patent Application No. 2005-221056, filed Jul. 29, 2005, the entire contents of which are incorporated herein by reference.

BACKGROUND

1. Field

One embodiment of the invention relates to an information processing apparatus provided with a privacy filter to make it difficult for another person to look in on a display screen.

2. Description of the Related Art

In recent years, a liquid crystal display has been widely used as a display for a notebook computer, a monitor, etc. The liquid crystal display has had a viewing angle at the same level as a CRT with the progress of improvement in viewing angle dependency of the liquid crystal display.

However, there is a demand for a display that can be viewed from the front and is hard to view from a slanting direction, for example, centering on the use of a mobile terminal, etc., for the purpose of preventing any other person than the user positioned roughly at the front of the display from seeing the displayed information when the user creates or reads a secret document, etc., in a public space, etc., and for the purpose of enabling the user to read or write private mail without concern for the surroundings.

It is disclosed by, for example, Japanese Patent Application Publication (KOKAI) No. 2004-133334, an art using a liquid crystal panel (hereinafter, privacy filter) is disclosed as an art of controlling the viewing angle. In the art described in JP-A-2004-13334, if a privacy filter is turned on, a disturbance pattern is seen from the slanting direction for protecting information on the screen such as text. If the privacy filter operates, the user at the front of the display screen views the screen normally. If the viewing angle control filter is turned off, the user can see the display screen at the essential viewing angle of the image display panel to display an image.

At present, a search is made for how to enhance concealment of the description displayed on the display screen using the privacy filter described above.

One embodiment of the invention provides an information processing apparatus capable of enhancing concealment of information displayed on a display screen using a privacy filter for controlling the viewing angle.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, an information processing apparatus includes: a display panel; a filter facing the display panel; and a drive section turns on the filter in response to driving start of the display panel.

Figure 1:
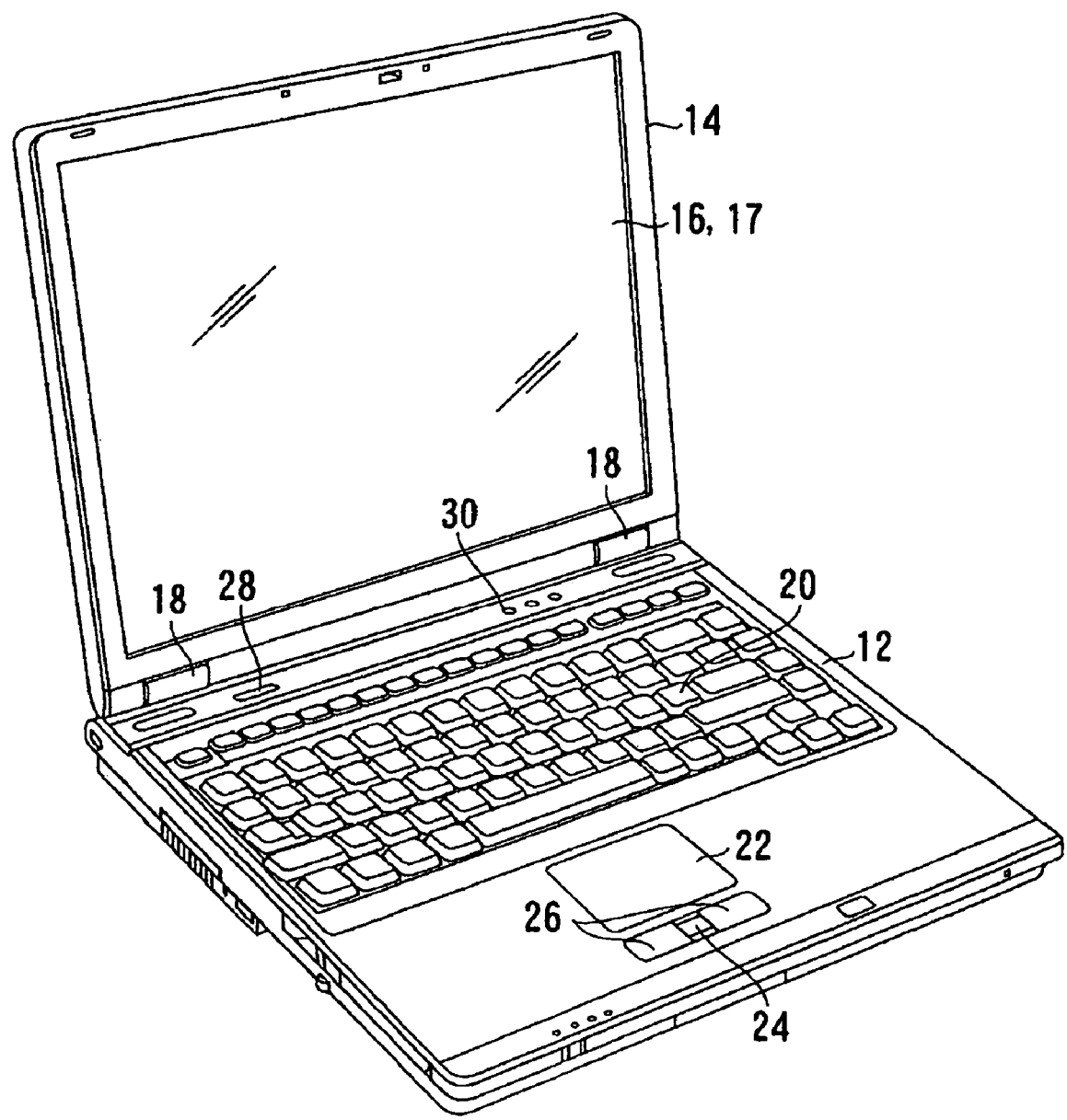
FIG. 1 is an exemplary perspective view to show a schematic configuration of a personal computer according to an embodiment of the invention.

According to an embodiment, FIG. 1 shows a configuration of a notebook personal computer as an information processing apparatus.

A personal computer 10 is made up of a computer main unit 12 and a display unit 14. An LCD (Liquid Crystal Display) 16 of a display panel and a privacy filter 17 are built in the display unit 14.

Figure 2:
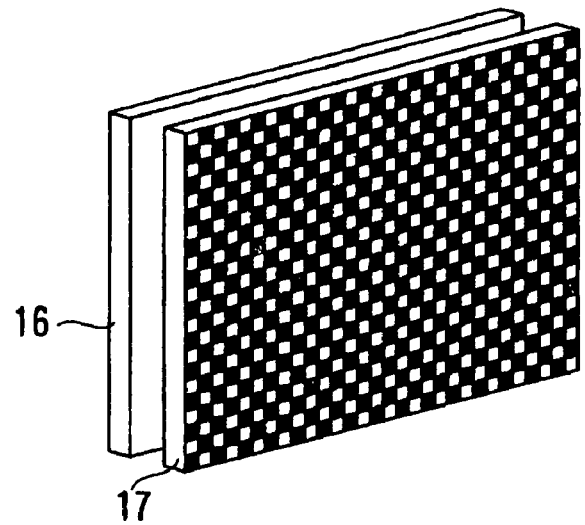
FIG. 2 is an exemplary drawing to show a placement relationship between an LCD and a privacy filter according to the embodiment.

The privacy filter 17 is put on the image display surface of the LCD 16, as shown in FIG. 2. The privacy filter 17 may be put on an opposite face to the image display surface of the LCD 16. It can also be put on a display having a deflecting plate on the panel surface such as an organic EL panel as well as the liquid crystal panel for use.

The display unit 14 as a display section is attached to hinges (support parts) 18 provided at an end of the depth of the computer main unit 12 so that the display unit 14 changes pivotally between the closed position covering the top face of the computer main unit 12 and the open position where the top face of the computer main unit 12 is exposed.

The computer main unit 12 has a thin box-shaped cabinet and is provided with a keyboard 20 in the center of the top face of the cabinet. The computer main unit 12 is formed with a palm rest on the top face of the cabinet on the front of the computer main unit 12. A touch pad 22, a scroll button 24, and a touch pad control button 26 are provided almost in the center of the palm rest. A power button 28 for turning on/off power of the computer main unit 12 and a privacy filter button 30 are placed on the top face of the cabinet at the depth of the computer main unit 12.

Figure 3A:
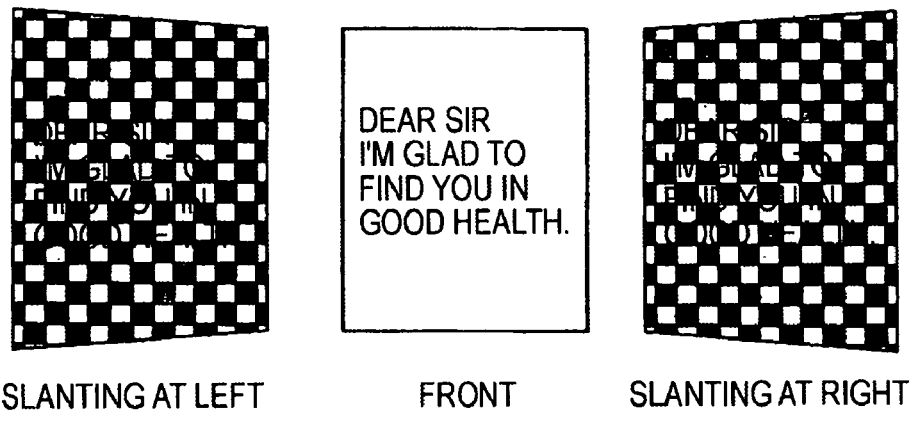
FIG. 3 is an exemplary drawing to describe a viewing angle control using the privacy filter according to the embodiment.
Figure 3B:

FIG. 3 shows an example of how the screen is viewed when the privacy filter 17 is put on the LCD 16. The three screens at the upper stage of the figure show a state in which a voltage is applied to the privacy filter 17; the three screens at the lower stage of the figure show a state in which no voltage is applied to the privacy filter 17. The left screen shows the screen viewed from the slanting direction at the left; the center screen shows the screen viewed from the front; and the right screen shows the screen viewed from the slanting direction at the right.

When no voltage is applied to the privacy filter 17, usual display is produced regardless of which direction (front, left slanting, or right slanting) the user views the screen from.

On the other hand, a voltage is applied to the privacy filter 17, usual display is produced when the user views the screen from the front. However, if the user views the screen from the slanting direction at the left or the right, black parts occur in response to areas provided on an alignment layer, disturbing the display on the liquid crystal display. Such a disturbance pattern is displayed, whereby the screen can be made hard to recognize from the lateral slanting direction and any person other than the user can be prevented from looking in on the display screen.

Next, an example of the system configuration of the computer will be discussed with reference to FIG. 4.

Figure 4:
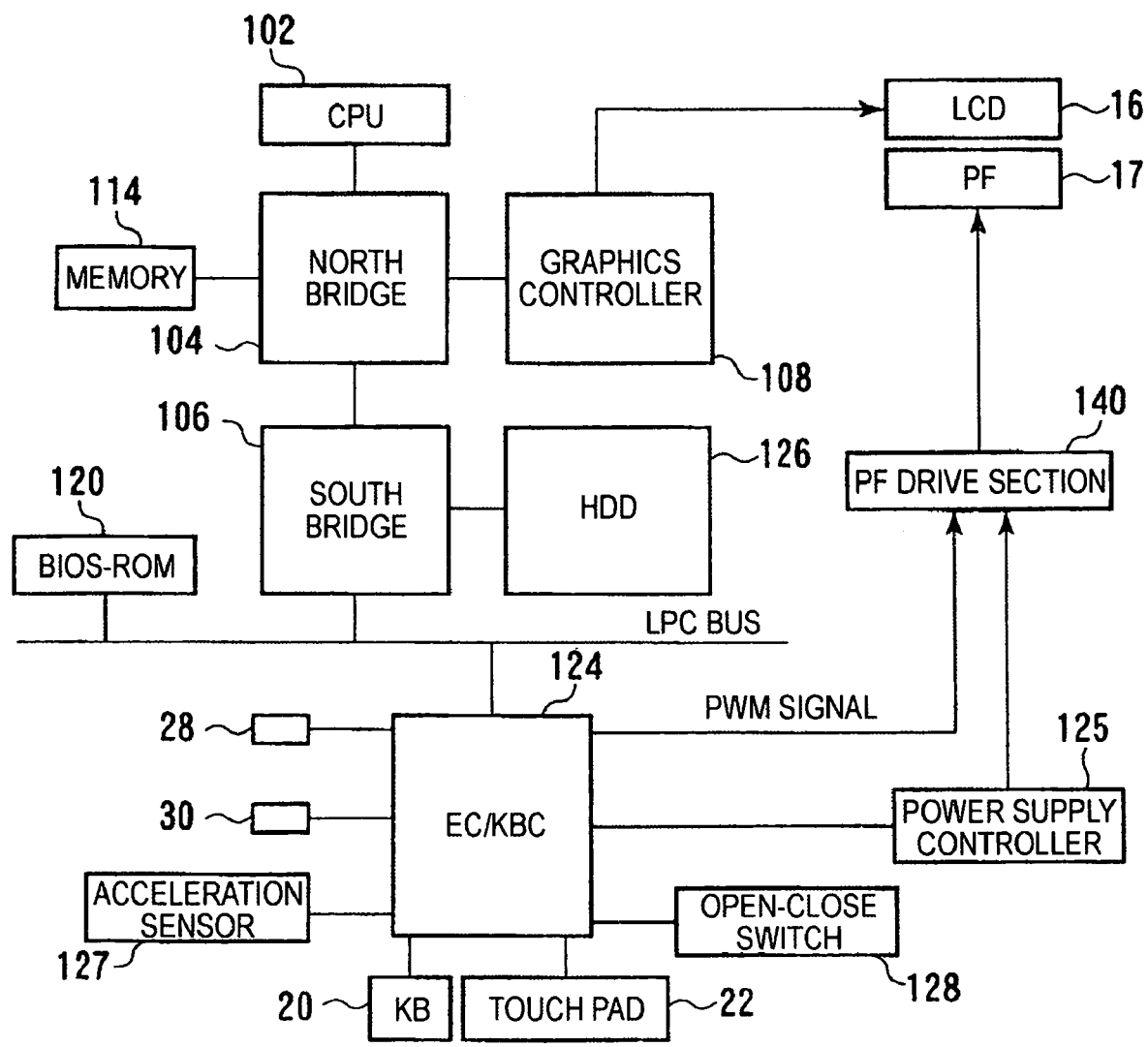
FIG. 4 is an exemplary block diagram to show a circuit configuration of the personal computer according to the embodiment.

As shown in FIG. 4, the computer includes a CPU 101, a north bride 104, main memory 114, a graphics controller 108, a south bridge 106, BIOS-ROM 120, a hard disk drive (HDD) 126, an embedded controller/keyboard controller IC (EC/KBC) 124, a power supply controller 125, and the like.

The CPU 101 is a processor provided for controlling the operation of the computer and executes an operating system (OS) and various application programs loaded into the main memory 114 from the hard disk drive (HDD) 126.

The CPU 102 also loads a system BIOS (Basic Input Output System) stored in the BIOS-ROM 120 into the main memory 114 and then executes the system BIOS. The system BIOS is a program for controlling hardware.

The north bride 104 is a bridge device for connecting a local bus of the CPU 102 and the south bridge 106. The north bride 104 also contains a memory controller for controlling access to the main memory 114. The north bride 104 also has a function of executing communications with the graphics controller 108 via an AGP (Accelerated Graphics Port) bus, etc.

The graphics controller 108 is a display controller for controlling the LCD 16 used as the display monitor of the computer 10. The graphics controller 108 has video memory (VRAM) and generates a video signal for forming a display image to be displayed on the LCD 16 from display data drawn in the video memory by the OS/application program. The video signal generated by the graphics controller 108 is output to a line.

The embedded controller/keyboard controller IC (filter control section) 124 functions as a controller for controlling the touch pad 22, the scroll button 24, and the touch pad control button 26 as an input unit and also controlling the privacy filter 17. The embedded controller/keyboard controller IC 124 is a one-chip microcomputer for monitoring and controlling various devices (peripheral devices, sensors, power supply circuit, etc.,) regardless of the system state of the computer system 10.

When the power is turned on as the driving start time of the LCD 16, the embedded controller/keyboard controller IC 124 automatically supplies a PWM signal as a drive start signal to a privacy filter drive section 140. The privacy filter drive section 140 supplies a drive signal responsive to the PWM signal to the privacy filter 17, whereby driving of the privacy filter 17 is started. Driving of the LCD 16 is started not only at the power on time, but also at the restoration time from a resume state; driving of the privacy filter 17 is also automatically started at the restoration time from the resume state.

An acceleration sensor 127 is provided and the measurement value of the acceleration sensor 127 is supplied to the embedded controller/keyboard controller IC 124. An open-close switch 128 is provided as an open-close detection section for detecting whether or not the display unit 14 is placed at the closed position. The detection result of the open-close switch 128 is supplied to the embedded controller/keyboard controller IC 124.

Figure 5:
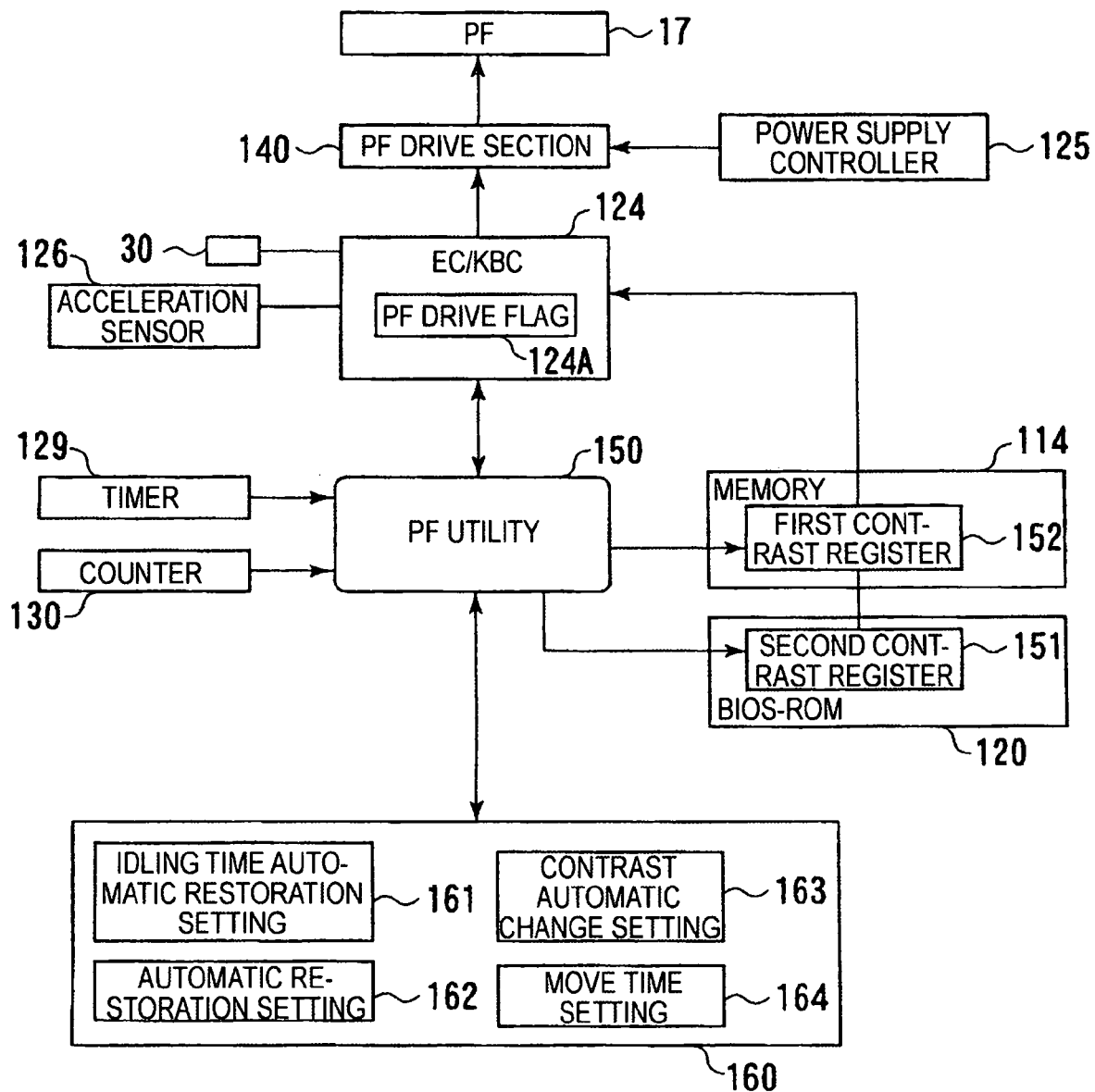
FIG. 5 is an exemplary block diagram to show a configuration for driving the privacy filter.
Figure 6:
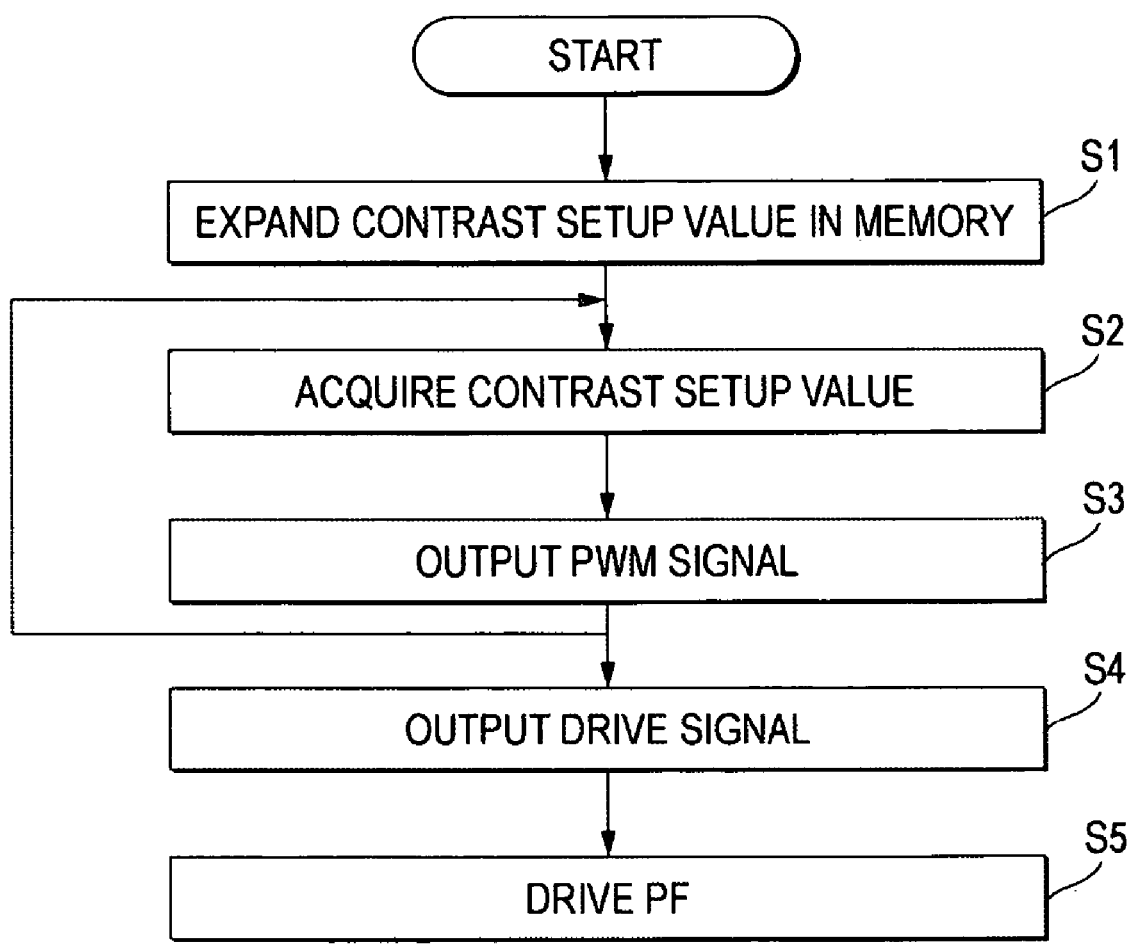
FIG. 6 is an exemplary flowchart to show a processing procedure for automatically driving the privacy filter according to the embodiment.

Next, FIG. 5 shows the configuration for controlling driving of the privacy filter 17. First, while the configuration for controlling driving of the privacy filter 17 will be discussed with FIG. 5, processing of automatically driving the privacy filter 17 at the driving start time of the LCD 16 will be discussed with reference to a flowchart of FIG. 6.

A setup value of contrast of disturbance displayed on the privacy filter 17 is stored in a first contrast register 151 in the BIOS-ROM 120, as shown in FIG. 5. The CPU 102 executes the program contained in the BIOS-ROM 120 at the booting time, whereby the contrast setup value in the first contrast register 151 is expanded in a second contrast register 152 in the main memory 114 (step S1). The EC/KBC 124 acquires the contrast setup value stored in the second contrast register 152 (step S2). The EC/KBC 124 supplies a PWM signal responsive to the contrast setup value to the privacy filter drive section 140 and validates a privacy filter drive flag 124A (step S3). The privacy filter drive section 140 adjusts the voltage supplied from the power supply controller 125 in response to the PWM signal supplied from the EC/KBC 124 and supplies a drive signal to the privacy filter 17 (step S4). As the drive signal is supplied to the privacy filter 17, the privacy filter 17 is turned on (step S5).

The embedded controller/keyboard controller IC 124 acquires the contrast setup value in the first contrast register 151 at regular time intervals and supplies a PWM signal responsive to the newly acquired contrast setup value to the privacy filter drive section 140 (loop processing of steps S2 and S3). Therefore, the setup value in the first contrast register 151 is changed, whereby the contrast of the disturbance pattern displayed on the privacy filter 17 can be changed.

Further, a configuration to control driving the privacy filter 17 will be discussed.

The embedded controller/keyboard controller IC 124 controls driving the privacy filter 17 in response to the detection result of the open-close switch 128 for detecting whether or not the display unit 14 is at the closed position. If the open-close switch 128 detects that the display unit 14 is placed at the closed position, the embedded controller/keyboard controller IC 124 stops driving the privacy filter 17. If the open-close switch 128 detects that the display unit 14 is opened from the closed state, the embedded controller/keyboard controller IC 124 restarts driving the privacy filter 17.

If the user operates the privacy filter button 30, the EC/KBC 124 controls driving the privacy filter 17. That is, when the privacy filter 17 is driven, if the user operates the privacy filter button 30, the embedded controller/keyboard controller IC 124 stops supplying the PWM signal to the privacy filter drive section 140 to stop driving the privacy filter 17 and also invalidates the privacy filter drive flag 124A. When driving the privacy filter 17 stops, if the user operates the privacy filter button 30, the embedded controller/keyboard controller IC 124 restarts supplying the PWM signal to the privacy filter drive section 140 to restart driving the privacy filter 17 and also validates the privacy filter drive flag 124A.

A privacy filter utility 150 as a detection section can acquire the state of the privacy filter drive flag 124A every predetermined timing to detect whether or not the privacy filter 17 drives.

After driving the privacy filter 17 stops, the privacy filter utility 150 controls the privacy filter 17 based on idling time automatic restoration setting 161, automatic restoration setting 162, and contrast automatic change setting 163 in a registry 160 stored in the hard disk drive 126 using a timer 129 and a counter 130. The privacy filter utility 150 is an application program stored in the hard disk drive 126.

The privacy filter utility 150 also controls the privacy filter 17 in response to the measurement value of the acceleration sensor 127 and move time setting 164.

The idling time automatic restoration setting 161, the automatic restoration setting 162, the contrast automatic change setting 163, and the move time setting 164 are registered in the registry 160 stored in the hard disk drive 126.

The contrast setup value in the first contrast register 151, the idling time automatic restoration setting 161, the automatic restoration setting 162, the contrast automatic change setting 163, and the move time setting 164 can be changed by the privacy filter utility 150.

Figure 7:
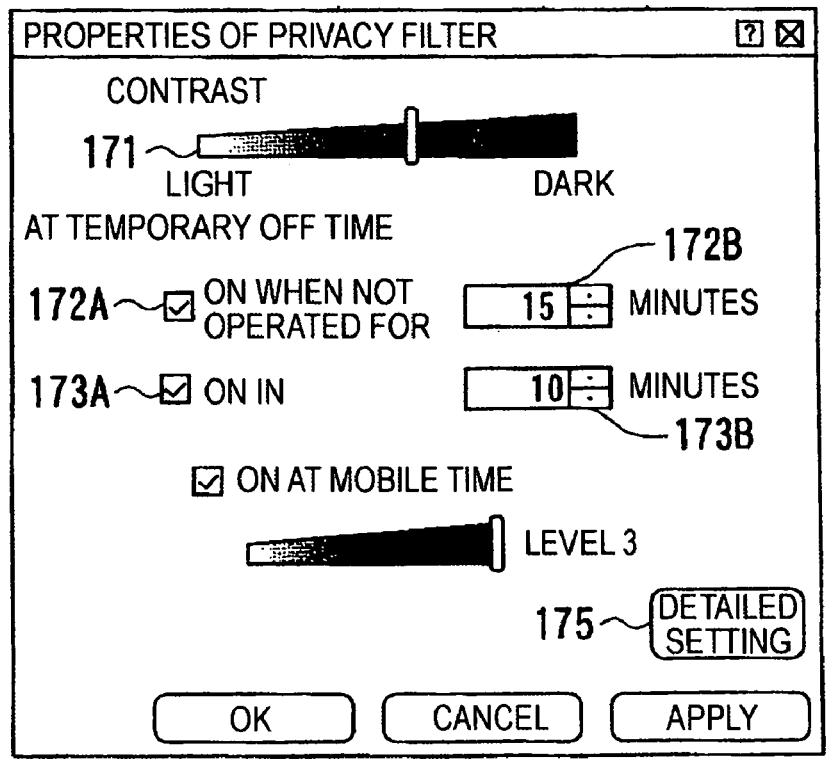
FIG. 7 is an exemplary drawing to show a setting screen to change the contrast setup value, idling time automatic restoration setting, automatic restoration setting, contrast automatic change setting, and move time setting by a privacy filter utility according to the embodiment.
Figure 8:
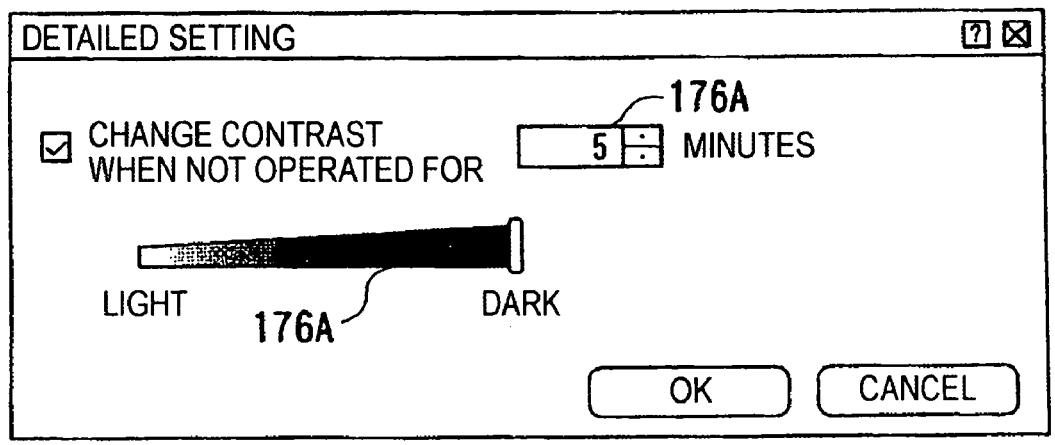
FIG. 8 is an exemplary drawing to show a setting screen to set the contrast of a disturbance pattern at the idling time according to the embodiment.

FIGS. 7 and 8 show setting screens to change the contrast setup value in the first contrast register 151, the idling time automatic restoration setting 161, the automatic restoration setting 162, the contrast automatic change setting 163, and the move time setting 164 by the privacy filter utility 150.

A slide bar 171 is provided for changing the contrast setup values stored in the first contrast register 151 and the second contrast register 152, as shown in FIG. 7. The contrast of the disturbance pattern displayed on the usual privacy filter 17 can be set according to the contrast setup values stored in the first contrast register 151 and the second contrast register 152.

A check box 172A and a time setting field 172B are provided for setting the idling time automatic restoration setting 161. When the privacy filter 17 is off, the privacy filter 17 can be switched between on and off using the check box 172A if the user does not operate any of the keyboard 20, the touch pad 22, the scroll button 24, or the touch pad control button 26 for a predetermined time. In the description to follow, the state in which the user does not operate any of the keyboard 20, the touch pad 22, the scroll button 24, or the touch pad control button 26 is described as the idle state. The time until automatically turning on the privacy filter 17 from entering the idle state is set in the time setting field 172B.

A check box 173A and a time setting field 173B are provided for setting the automatic restoration setting 162. Whether or not the privacy filter 17 is automatically turned on when a predetermined time has elapsed since the privacy filter 17 was turned off can be specified in the check box 173A. The time until automatically turning on the privacy filter 17 is set in the time setting field 173B.

A check box 174A and a slide bar 174B are provided for setting the move time setting 164. The check box 174A is provided for specifying whether or not the privacy filter 17 is to be turned on in response to the measurement value of the acceleration sensor 127 when the privacy filter 17 is off. The threshold value of the measurement value for turning on the privacy filter 17 is set using the slide bar 174B.

If the user operates a detailed setting button 175 with a pointer displayed on the LCD 16, a window shown in FIG. 8 is displayed.

A check box 176A and a slide bar 176B shown in FIG. 8 are provided for setting the contrast automatic change setting 163. Whether or not the contrast of the disturbance pattern displayed on the privacy filter 17 is to be changed when a predetermined time has elapsed since the privacy filter 17 was turned off can be specified in the check box 176A. To change the contrast, the contrast can be set using the slide bar 176B.

Next, processing based on the idling time automatic restoration setting 161, the automatic restoration setting 162, and the move time setting 164 after the user stops driving the privacy filter 17 by operating the privacy filter button 30 when the privacy filter 17 drives will be discussed.

Figure 9:
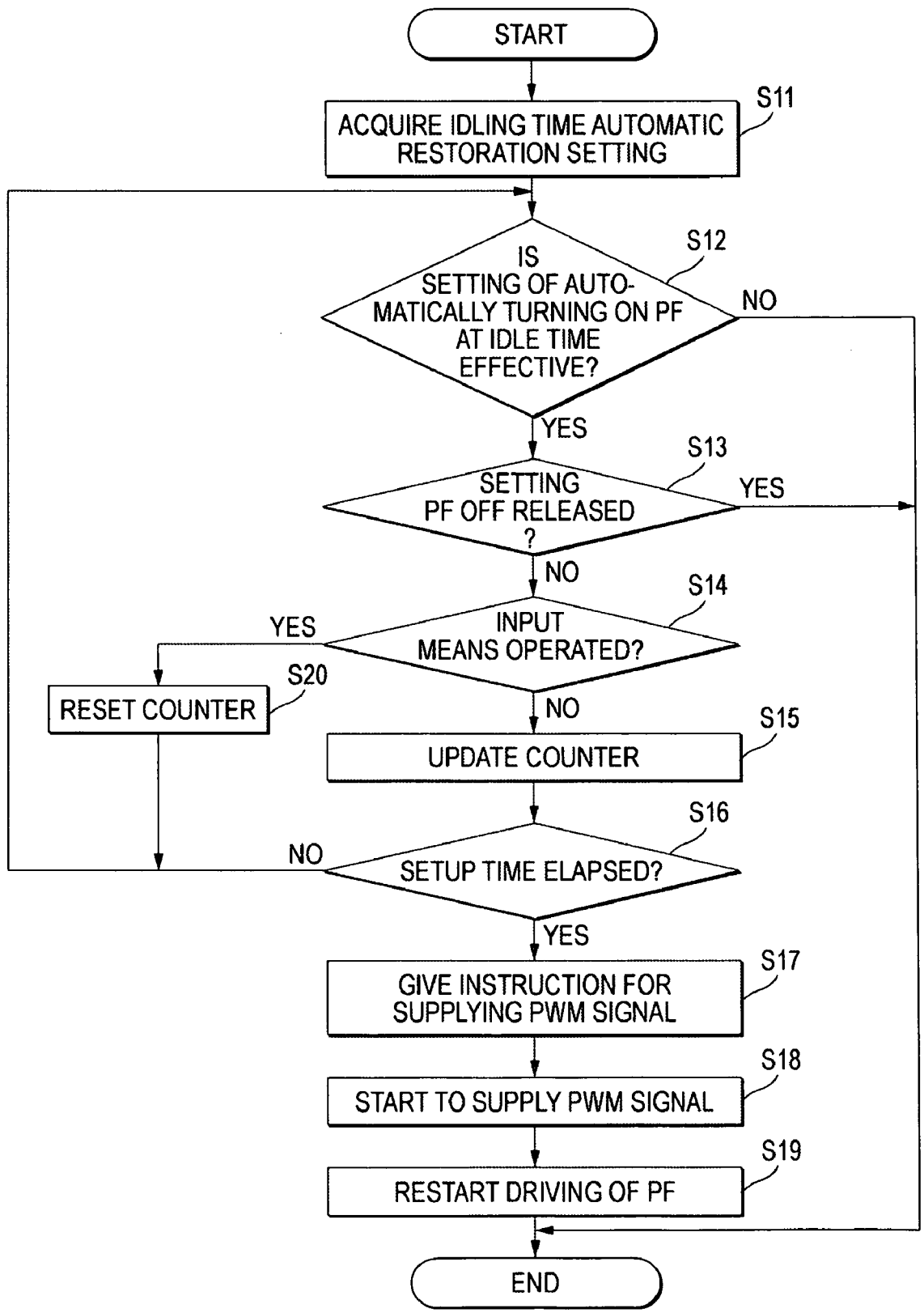
FIG. 9 is an exemplary flowchart to show a processing procedure capable of automatically turning on the privacy filter when the user does not operate an input unit for a given time after the privacy filter is turned off according to the embodiment.

First, processing of the function capable of automatically turning on the privacy filter 17 when the user does not operate the input unit of the keyboard 20, etc., for a given time after the privacy filter 17 is turned off will be discussed with reference to FIG. 9.

The privacy filter utility 150 acquires the state of the privacy filter drive flag 124A to detect that driving of the privacy filter 17 stops.

The privacy filter utility 150 references a privacy filter off flag and detects that the privacy filter 17 is turned off. The privacy filter utility 150 acquires the idling time automatic restoration setting 161 (step S11). The privacy filter utility 150 determines whether or not the setting of automatically turning on the privacy filter 17 at the idle time is effective (step S12).

If the setting is not effective (NO at step S12), the processing of the privacy filter utility 150 terminates.

If the setting of turning on the privacy filter 17 at the idle time is effective (YES at step S12), the privacy filter utility 150 references the privacy filter off flag and determines whether or not setting the privacy filter 17 off is released (step S13). If setting the privacy filter 17 off is released (YES at step S13), the processing of the privacy filter utility 150 terminates.

If setting the privacy filter 17 off is not released (NO at step S13), whether or not the user operates the input unit of the keyboard 20, etc., is determined (step S14). If the user operates the input unit (YES at step S14), the count value of the counter 130 is reset (step S20). After the expiration of a predetermined time since the previous processing at step S12 was executed according to measurement of the timer 129, processing at step S12 is executed.

If the user does not operate the input unit (NO at step S14), the privacy filter utility 150 updates the count value of the counter 130 (step S15). The privacy filter utility 150 acquires the count value of the counter 130 and determines whether or not the setup time in the idling time automatic restoration setting 161 has elapsed from the count value (step S16). When the setup time has not yet elapsed (NO at step S16), after the expiration of the predetermined time since the previous processing at step S12 was executed according to measurement of the timer 129, the privacy filter utility 150 executes step S12. When the setup time has elapsed (YES at step S16), the privacy filter utility 150 instructs the EC/KBC 124 to supply a PWM signal to the privacy filter drive section 140 (step S17). Then, the embedded controller/keyboard controller IC 124 supplies a PWM signal to the privacy filter drive section 140 and also validates the privacy filter drive flag 124A (step S18). The privacy filter drive section 140 supplies a drive signal responsive to the PWM signal to the privacy filter 17, thereby restarting driving of the privacy filter 17 (step S19).

The processing described above is performed, whereby the privacy filter 17 can be automatically driven if the user does not operate the input unit of the keyboard 20, etc., for the setup predetermined time after driving of the privacy filter 17 is stopped.

Figure 10:
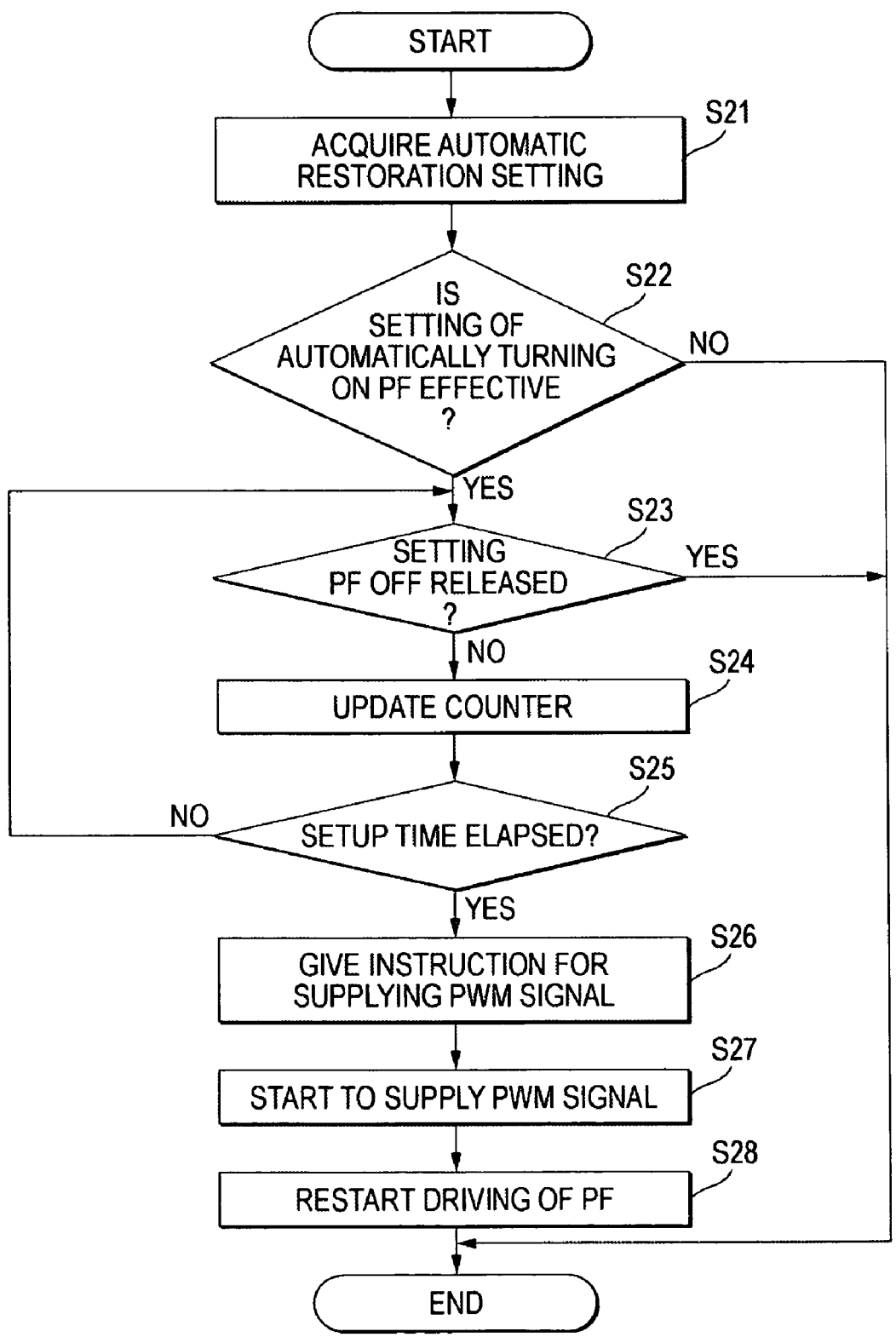
FIG. 10 is an exemplary flowchart to show a processing procedure capable of automatically turning on the privacy filter in a predetermined time after driving of the privacy filter is stopped according to the embodiment.

Next, processing of the function capable of automatically turning on the privacy filter 17 in a predetermined time after driving of the privacy filter 17 is stopped will be discussed with reference to FIG. 10.

The privacy filter utility 150 acquires the state of the privacy filter drive flag 124A to detect that driving of the privacy filter 17 stops.

The privacy filter utility 150 acquires the automatic restoration setting 162 (step S21). The privacy filter utility 150 determines whether or not the setting of automatically turning on the privacy filter 17 is effective when a predetermined time has elapsed since the privacy filter 17 was turned off based on the automatic restoration setting 162 (step S22). If the setting is not effective (NO at step S22), the processing of the privacy filter utility 150 terminates.

If the setting of automatically turning on the privacy filter 17 is effective (YES at step S22), the privacy filter utility 150 acquires the state of the privacy filter drive flag 124A and determines whether or not driving stop of the privacy filter 17 is released (step S23). If driving stop of the privacy filter 17 is released (YES at step S23), the processing of the privacy filter utility 150 terminates. If driving stop of the privacy filter 17 is not released (NO at step S23), the privacy filter utility 150 updates the count value of the counter 130 (step S24). The privacy filter utility 150 acquires the count value of the counter 130 and determines whether or not the setup time in the automatic restoration setting 162 has elapsed (step S25).

When the setup time has not yet elapsed (NO at step S25), after the expiration of the predetermined time since the previous processing at step S23 was executed according to measurement of the timer 129, the privacy filter utility 150 again executes step S23. When the setup time has elapsed (YES at step S25), the privacy filter utility 150 instructs the EC/KBC 124 to supply a PWM signal to the privacy filter drive section 140 to restart driving the privacy filter 17 (step S26). Then, the embedded controller/keyboard controller IC 124 supplies a PWM signal to the privacy filter drive section 140 and also validates the privacy filter drive flag 124A (step S27). The privacy filter drive section 140 supplies a drive signal responsive to the PWM signal to the privacy filter 17, thereby restarting driving of the privacy filter 17 (step S28).

The processing described above is performed, whereby the privacy filter 17 can be automatically driven if the user does not operate the input unit of the keyboard 20, etc., when the setup predetermined time has elapsed.

Figure 11:
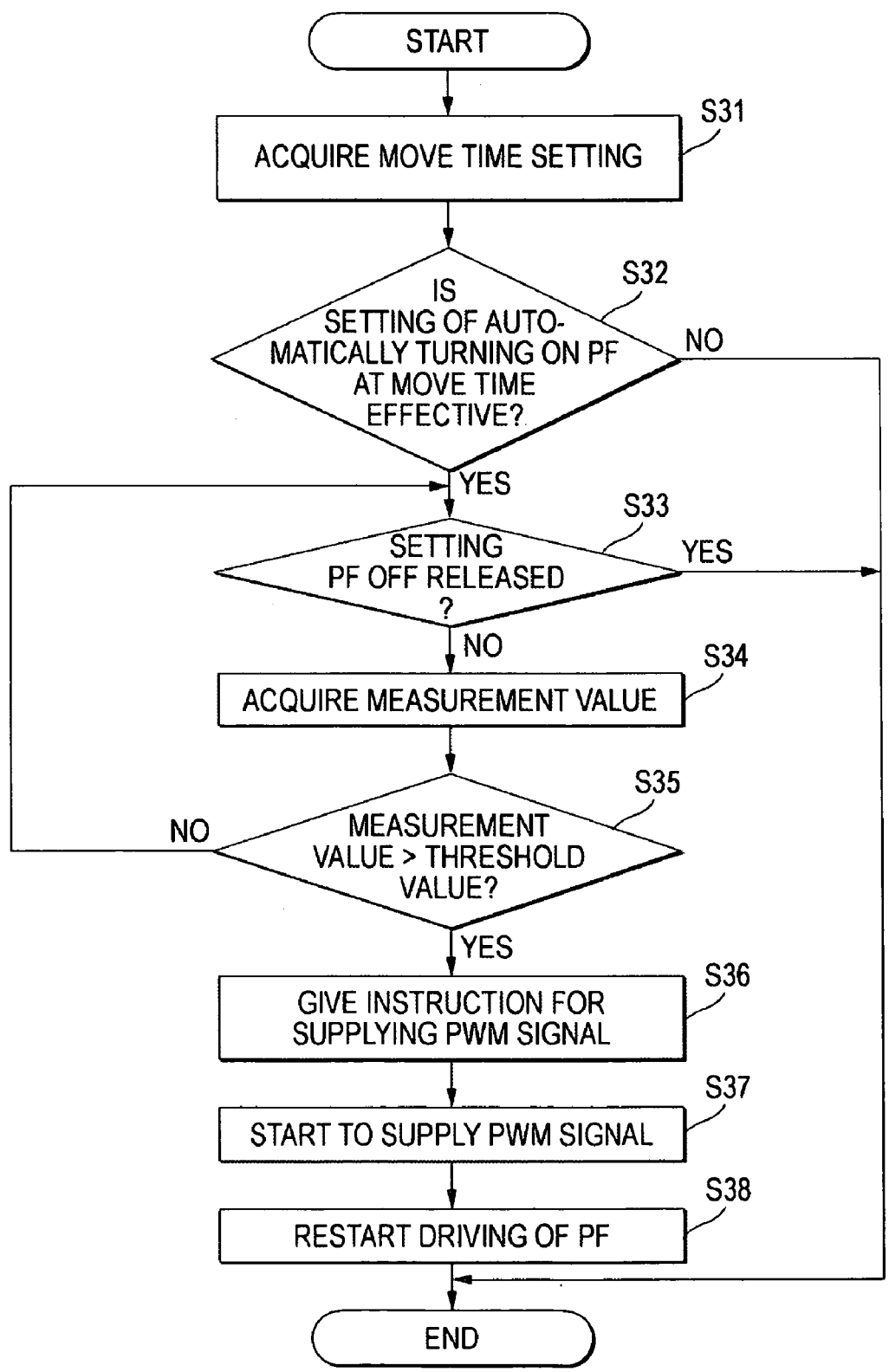
FIG. 11 is an exemplary flowchart to show a processing procedure capable of automatically turning on the privacy filter at the moving time after the privacy filter is turned off according to the embodiment.

Next, processing of the function capable of automatically turning on the privacy filter 17 at the move time after the privacy filter 17 is turned off will be discussed with reference to FIG. 11.

The privacy filter utility 150 acquires the state of the privacy filter drive flag 124A to detect that driving of the privacy filter 17 stops.

The privacy filter utility 150 acquires the move time setting 164 (step S31). The privacy filter utility 150 determines whether or not the setting of automatically turning on the privacy filter 17 is effective at the move time of the computer 10 (step S32). If the setting is not effective (NO at step S32), the processing of the privacy filter utility 150 terminates.

If the setting is effective (YES at step S32), the privacy filter utility 150 acquires the state of the privacy filter drive flag 124A and determines whether or not driving stop of the privacy filter 17 is released (step S33). If driving stop of the privacy filter 17 is released (YES at step S33), the processing of the privacy filter utility 150 terminates. If driving stop of the privacy filter 17 is not released (NO at step S33), the privacy filter utility 150 acquires the measurement value from the acceleration sensor 127 (step S34). The privacy filter utility 150 makes a comparison between the measurement value and the threshold value contained in the move time setting 164 to determine whether or not the measurement value is greater than the threshold value (step S35). If the measurement value is equal to or less than the threshold value (YES at step S35), after the expiration of a predetermined time since the previous processing at step S33 was executed according to measurement of the timer 129, the privacy filter utility 150 again executes step S33.

If the measurement value is greater than the threshold value (YES at step S35), the privacy filter utility 150 instructs the EC/KBC 124 to supply a PWM signal to the privacy filter drive section 140 to restart driving the privacy filter 17 (step S36). Then, the embedded controller/keyboard controller IC 124 supplies a PWM signal to the privacy filter drive section 140 and also validates the privacy filter drive flag 124A (step S37). The privacy filter drive section 140 supplies a drive signal responsive to the PWM signal to the privacy filter 17, thereby restarting driving of the privacy filter 17 (step S38).

The processing described above is performed, whereby it is made possible to automatically turn on the privacy filter 17 at the move time after the privacy filter 17 is turned off.

Figure 12:
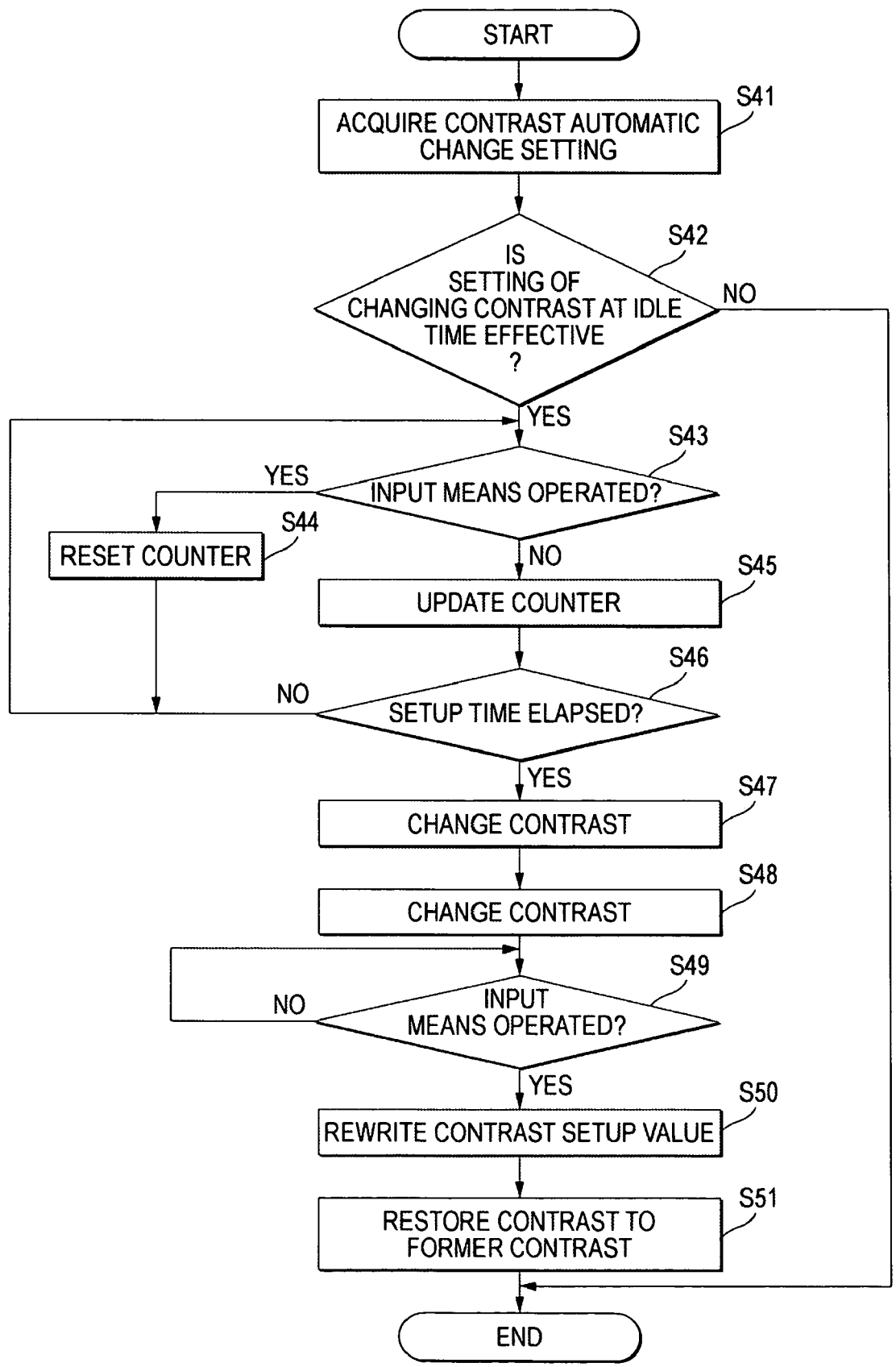
FIG. 12 is an exemplary flowchart to show a processing procedure capable of automatically changing the contrast of the disturbance pattern displayed on the privacy filter at the idling time according to the embodiment.

Next, processing of the function capable of automatically changing the contrast of the disturbance pattern displayed on the privacy filter 17 at the idling time will be discussed with reference to FIG. 12.

The privacy filter utility 150 acquires the contrast automatic change setting 163 (step S41). The privacy filter utility 150 determines whether or not the setting of automatically changing the contrast of the disturbance pattern displayed on the privacy filter 17 at the idle time is effective (step S42). If the setting is not effective (NO at step S42), the processing of the privacy filter utility 150 terminates.

If the setting is effective (YES at step S42), whether or not the user operates the input unit of the keyboard 20, etc., is determined (step S43). If the user operates the input unit (YES at step S43), the count value of the counter 130 is reset (step S43). After the expiration of a predetermined time since the previous processing at step S43 was executed according to measurement of the timer 129, processing at step S43 is executed.

If the user does not operate the input unit (NO at step S43), the privacy filter utility 150 updates the count value of the counter 130 (step S45). The privacy filter utility 150 acquires the count value of the counter 130 and determines whether or not the setup time in the contrast automatic change setting 163 has elapsed from the count value (step S46). When the setup time has not yet elapsed (NO at step S46), after the expiration of the predetermined time since the previous processing at step S42 was executed according to measurement of the timer 129, the privacy filter utility 150 executes step S42. When the setup time has elapsed (YES at step S46), the privacy filter utility 150 rewrites the contrast setup value in the second contrast register 152 in the main memory 114 based on the setting of the contrast automatic change setting 163 to change the contrast of the disturbance pattern (step S47). The PWM signal supplied from the EC/KBC 124 to the privacy filter drive section 140 changes in response to the change of the contrast setup value stored in the second contrast register 152, whereby the drive signal supplied from the privacy filter drive section 140 to the privacy filter 17 also changes, whereby the contrast of the disturbance pattern displayed on the privacy filter 17 changes (step S48). At this time, the contrast setup value stored in the first contrast register 151 in the BIOS-ROM 120 is not rewritten.

The privacy filter utility 150 repeatedly determines whether or not the user operates the keyboard 20, etc., every predetermined time based on the time count of the timer 129 (step S49) until the user operates the keyboard 20, etc. If the user operates the keyboard 20, etc., (YES at S49), the privacy filter utility 150 rewrites the contrast setup value in the second contrast register 152 in the main memory 114 using the contrast setup value stored in the first contrast register 151 in the BIOS-ROM 120 to restore the contrast of the disturbance pattern to the former contrast (step S50). The PWM signal supplied from the EC/KBC 124 to the privacy filter drive section 140 changes in response to the change of the contrast setup value stored in the second contrast register 152 and the drive signal supplied from the privacy filter drive section 140 to the privacy filter 17 also changes, whereby the contrast of the disturbance pattern displayed on the privacy filter 17 changes (step S51).

The processing described above is performed, whereby the contrast of the disturbance pattern displayed on the privacy filter 17 can be automatically changed if the user does not operate the input unit of the keyboard 20, etc., when the setup predetermined time has elapsed.

It is to be understood that the invention is not limited to the specific embodiment described above and that the invention can be embodied with the components modified without departing from the spirit and scope of the invention. The invention can be embodied in various forms according to appropriate combinations of the components disclosed in the embodiment described above. For example, some components may be deleted from all components shown in the embodiment. Further, the components in different embodiments may be used appropriately in combination.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An information processing apparatus comprising:
   a display panel;
   a filter facing the display panel;
   a drive section configured to drive the filter based on a drive signal supplied thereto;
   a filter switch configured to be manipulated by a user; and
   a control section configured to:
      supply the drive signal to the drive section to turn on the filter when the display panel is activated to display an object,
      stop the drive signal when the filter switch is manipulated to turn off the filter, and
      re-supply the drive signal to the drive section to turn on the filter when a predetermined time has been elapsed since the driving of the filter has been stopped.

2. The information processing apparatus as claimed in claim 1, wherein the drive section turns on the filter at least on performing power on or on restoring from a resume state.

3. The information processing apparatus as claimed in claim 1, further comprising:
   a filter turning off operation section that stops driving of the filter;
   an input unit;
   a detection section that detects that the driving of the filter stops as the filter turning off operation section is operated; and
   the control section that supplies the drive signal to the drive section to restart driving of the filter when the input unit is not operated for a predetermined time since stop of the driving of the filter if the detection section detects the stop of the driving of the filter.

4. The information processing apparatus as claimed in claim 3, wherein when a predetermined time elapses since the driving of the filter is stopped in response to an operation of the filter turning off operation section, the control section supplies the drive signal to the drive section to drive the filter.

5. The information processing apparatus as claimed in claim 1, further comprising:
   a filter turning off operation section that stops driving of the filter;
   a detection section that detects that the driving of the filter stops as the filter turning off operation section is operated; and
   the control section that supplies the drive signal to the drive section to drive the filter when a predetermined time elapses since stop of the driving of the filter if the detection section detects the stop of the driving of the filter.

6. The information processing apparatus as claimed in claim 1, further comprising:
   an acceleration sensor;
   a filter turning off operation section that stops driving of the filter; and
   the control section that supplies the drive signal to the drive section to drive the filter if a measurement value of the acceleration sensor exceeds a predetermined value in a state in which the driving of the filter is stopped in response to an operation of the filter turning off operation section.

7. The information processing apparatus as claimed in claim 1, wherein the display panel controls a light quantity in a predetermined direction other than a normal direction to the face of the display panel in accordance with a value of the drive signal.

8. The information processing apparatus as claimed in claim 7 further comprising:
   an input unit; and
   the control section that adjusts the value of the drive signal supplied to the filter when the input unit is not operated for a predetermined time.

9. The information processing apparatus as claimed in claim 8, wherein if the input unit is operated after the value of the drive signal is adjusted, the value of the drive signal is restored to a value before adjusting.

10. The information processing apparatus as claimed in claim 1, further comprising:
    a main unit;
    a display section including the display panel and the filter and being supported on the main unit and being pivotable between a closed position covering a top face of the main unit and an open position where the top face of the main unit is exposed;
    an open-closed detection section that detects whether or not the display section is at the closed position; and
    the control section that controls driving of the filter in response to a detection result of the open-closed detection section.

11. An information processing apparatus comprising:
a display unit including a display panel;
a privacy filter to obscure images displayed on a display panel of the display unit and viewed from a lateral slanting direction;
a drive section configured to drive the privacy filter based on a drive signal supplied thereto;
a filter switch configured to be manipulated by a user; and
a control section configured to (i) supply the drive signal to the drive section to turn on the privacy filter during initial power-on, (ii) stop the drive signal and turn off the privacy filter when the filter switch detects that the display unit is placed in a closed position, (iii) re-supply the drive signal to the drive section to turn on the privacy filter after the display unit is placed in an opened position, and (iv) re-supply the drive signal to the drive section after a predetermined time has elapsed since the drive signal has been stopped.

12. An information processing apparatus comprising:
an input unit;
a display unit including a display panel;
a privacy filter to obscure images displayed on a display panel of the display unit and viewed from a lateral slanting direction;
a drive section configured to drive the privacy filter based on a drive signal supplied thereto;
a filter switch configured to be manipulated by a user; and
a control section configured to (i) supply the drive signal to the drive section to turn on the privacy filter during initial power-on, (ii) stop the drive signal and turn off the privacy filter when the filter switch detects that the display unit is placed in a closed position, (iii) re-supply the drive signal to the drive section to turn on the privacy filter after the display unit is placed in an opened position, and (iv) adjust the value of the drive signal supplied to the filter when the input unit is not operated for a predetermined time.

13. The information processing apparatus as claimed in claim 12, wherein if the input unit is operated after the value of the drive signal is adjusted, the value of the drive signal is restored to a value before adjusting.

* * * * *